(12) United States Patent
Margolin

(10) Patent No.: US 8,684,192 B1
(45) Date of Patent: Apr. 1, 2014

(54) CADDY FOR HOLDING AND DRAINING WASHING TOOLS

(76) Inventor: Steven J. Margolin, East Northport, NY (US)

(*) Notice: Subject to any disclaimer, the term of this patent is extended or adjusted under 35 U.S.C. 154(b) by 75 days.

(21) Appl. No.: 13/341,769

(22) Filed: Dec. 30, 2011

(51) Int. Cl.
*A47G 19/08* (2006.01)
(52) U.S. Cl.
USPC .......................................... 211/41.3
(58) Field of Classification Search
USPC ........... 211/41.3, 41.1, 41.2, 41.4, 41.5, 41.6; 206/373
See application file for complete search history.

(56) References Cited

U.S. PATENT DOCUMENTS

| | | | | |
|---|---|---|---|---|
| 591,377 | A * | 10/1897 | Bunce | 211/41.3 |
| 1,185,677 | A * | 6/1916 | Jargstorf | 211/41.3 |
| 1,224,838 | A * | 5/1917 | Blissman et al. | 211/41.3 |
| 1,323,078 | A * | 11/1919 | Loudon | 211/41.3 |
| 2,151,818 | A | 3/1939 | Westenkirchner | |
| 2,262,767 | A * | 11/1941 | Jeter | 108/24 |
| D143,517 | S * | 1/1946 | Whitlock | D32/56 |
| 2,936,898 | A * | 5/1960 | Miguez | 211/41.3 |
| 2,954,875 | A * | 10/1960 | Becker | 211/41.3 |
| 4,480,343 | A * | 11/1984 | Drach | 211/41.3 |
| 4,515,332 | A | 5/1985 | Scharfy | |
| 4,531,641 | A * | 7/1985 | Archambault | 211/41.3 |
| 4,589,150 | A * | 5/1986 | Sciabarassi | 211/41.3 |
| 5,105,485 | A * | 4/1992 | Sciabarassi | 108/24 |
| 5,127,616 | A | 7/1992 | Carney | |
| 5,396,993 | A | 3/1995 | Spitler | |
| 5,492,237 | A * | 2/1996 | Chang | 211/41.3 |
| D370,323 | S * | 5/1996 | Lafond | D32/55 |
| 5,943,786 | A * | 8/1999 | Stahley | 211/41.3 |
| 6,062,397 | A * | 5/2000 | Licari | 211/41.3 |
| 6,491,170 | B1 * | 12/2002 | Madela | 211/41.3 |
| 6,763,954 | B1 * | 7/2004 | Travers et al. | 211/41.3 |
| 6,886,702 | B2 | 5/2005 | Trinidad et al. | |
| 6,929,130 | B2 * | 8/2005 | Sampaio | 211/41.6 |
| 2006/0289372 | A1 | 12/2006 | Yang et al. | |
| 2007/0090063 | A1 * | 4/2007 | Schmidt | 211/41.3 |
| 2010/0176017 | A1 | 7/2010 | Yang et al. | |
| 2010/0288659 | A1 * | 11/2010 | Dang | 206/373 |
| 2012/0138550 | A1 * | 6/2012 | Wisniewski | 211/41.3 |

* cited by examiner

*Primary Examiner* — Jose V Chen
(74) *Attorney, Agent, or Firm* — Dilworth & Barrese, LLP

(57) ABSTRACT

A holder suspending utensils alongside a sink having a rim and a bowl, resting freely on the rim of the sink, and draining liquid from the utensils guidingly into the bowl of the sink. The holder includes a base, a wall, and a chute. The base rests freely above, and across, the rim of the sink. The wall extends upwardly from one end of the base, and suspends the utensils. The chute extends generally coplanarly from an opposite end of the base, and drains the liquid from the utensils guidingly into the bowl of the sink.

24 Claims, 8 Drawing Sheets

CADDY FOR HOLDING AND DRAINING WASHING TOOLS

1. BACKGROUND OF THE INVENTION

A. Field of the Invention

The embodiments of the present invention relate to a holder for suspending utensils, and more particularly, the embodiments of the present invention relate to a holder for suspending utensils alongside a sink having a rim and a bowl, for resting freely on the rim of the sink, and for draining liquid from the utensils guidingly into the bowl of the sink.

B. Description of the Prior Art

Numerous innovations for cooking utensil racks/holders/stands have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a holder for suspending utensils alongside a sink having a rim and a bowl, for resting freely on the rim of the sink, and for draining liquid from the utensils guidingly into the bowl of the sink.

(1) U.S. Pat. No. 2,151,818 to Westenkirchmer.

U.S. Pat. No. 2,151,818—issued to Westenkirchmer on Mar. 28, 1939 in U.S. class 4 and subclass 187—teaches a kitchen sink having end compartments, and foldable walls hingedly engaged on the upper edges of the outer walls of the compartments to stand vertically when erect and fold inwardly closely adjacent the inner walls when folded thereagainst.

(2) U.S. Pat. No. 4,515,332 to Scharfy.

U.S. Pat. No. 4,515,332—issued to Scharfy on May 7, 1985 in U.S. class 248 and subclass 37.3—teaches a rack for supporting culinary utensils and disposing the portion thereof containing food remnants, grease, and the like over a sink or other receptacle capable of collecting and disposing of the drippings.

(3) U.S. Pat. No. 5,127,616 to Carney.

U.S. Pat. No. 5,127,616—issued to Carney on Jul. 7, 1992 in U.S. class 248 and subclass 176.2—teaches a device for holding pot lids and/or cooking utensils. The device includes a first generally planar component with separate notches, apertures, ledges or the like for supporting pot lids or cooking utensils. A second generally planar component is mounted to the first planar component to support the first planar component and to selectively receive cooking utensils supported by the first planar component, as well as retain any drippings from the utensils.

(4) U.S. Pat. No. 5,396,993 to Spitler.

U.S. Pat. No. 5,396,993—issued to Spitler on Mar. 14, 1995 in U.S. class 211 and subclass 41.2—teaches a holder or stand having a base formed with a central depression and a notched rail for supporting a kitchen implement. A pair of raised receptacles carried on the base insertably receive other implements, while an upright adjustable post supports a yoke or bifurcated member for slidably receiving and supporting a pot or pan lid. The holder or stand is readily disassembled for cleaning or maintenance purposes.

(5) U.S. Pat. No. 6,062,397 to Licari.

U.S. Pat. No. 6,062,397—issued to Licari on May 16, 2000 in U.S. class 211 and subclass 41.3—teaches an apparatus for suspending utensils over a sink, which includes a holding member coupled to a stabilizer. The holding member is configured to retain utensils, and the stabilizer includes a hook member having a contact surface for engaging the back of a sink faucet. The holding member also has a support surface for resting against a sidewall or top edge of the sink so that the stabilizer when engaged on the sink faucet in cooperation with the support surface and the force of gravity maintain the apparatus above the bottom surface of the sink In this way, the holding member suspends utensils, such as kitchen implements including dish racks, flatware, containers, and cutting boards, above the bottom surface of the sink.

(6) U.S. Pat. No. 6,886,702 to Trinidad et al.

U.S. Pat. No. 6,886,702—issued to Trinidad et al. on May 3, 2005 in U.S. class 211 and subclass 181.1—teaches apparatus for storing and dispensing kitchen articles, which includes an upstanding grate adapted to hang kitchen articles, to house kitchen articles, and to dispense kitchen articles. The kitchen articles are stored and dispensed from locations inside of, and outside of, the grate.

(7) United States Patent Application Publication Number 2006/0289372 to Yang et al.

United States Patent Application Publication Number 2006/0289372—published to Yang et al. on Dec. 28, 2006 in U.S. class 211 and subclass 41.3—teaches an organizer adapted for use adjacent a kitchen sink, which includes an elongated rack portion having a first end and an opposing second end. The rack portion further includes a front frame and a rear frame. The front frame defines a curved open space at about the center of the front frame to accommodate the faucet of a kitchen sink. The organizer further includes a first end support on which the first end of the rack portion is supported, and a second end support on which the second end of the rack portion is supported.

(8) United States Patent Application Publication Number 2010/0176017 to Yang et al.

United States Patent Application Publication Number 2010/0176017—published to Yang et al. on Jul. 15, 2010 in U.S. class 206 and subclass 373—teaches a sink organizer that includes a section defining a compartment having an extendable, collapsible, and/or expandable base that provides a deeper holding section, with an extended base to support a long slender shaped item, such as a long-handle brush. The expandable base has a telescopic structure that is in the form of an accordion-like structure having annular folding sections or other forms of axially collapsible or telescopic structure (e.g., a concentric coupling of a series of nested and axially interlocking cylindrical collars of gradually reducing dimensions). Suction cups provide mounting of the sink organizer onto a sink wall. A bracket is attached to the side of the sink organizer where the suction cup mounting is also provided. The bracket has a handle that is configured to rest against the top edge of the sink, thus providing additional support for stabilizing the sink organizer after it is attached to the sink wall by the suction cups.

It is apparent that numerous innovations for cooking utensil racks/holders/stands have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a holder for suspending utensils alongside a sink having a rim and a bowl, for resting freely on the rim of the sink, and for draining liquid from the utensils guidingly into the bowl of the sink

2. SUMMARY OF THE INVENTION

Thus, an object of the embodiments of the present invention is to provide a holder for suspending utensils alongside a sink having a rim and a bowl, for resting freely on the rim of the sink, and for draining liquid from the utensils guidingly into the bowl of the sink, which avoids the disadvantages of the prior art.

Briefly stated, another object of the embodiments of the present invention is to provide a holder suspending utensils alongside a sink having a rim and a bowl, resting freely on the rim of the sink, and draining liquid from the utensils guidingly into the bowl of the sink. The holder includes a base, a wall, and a chute. The base rests freely above and across the rim of the sink. The wall extends upwardly from one end of the base, and suspends the utensils. The chute extends generally coplanarly from an opposite end of the base, and drains the liquid from the utensils guidingly into the bowl of the sink.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows.

4. LIST OF REFERENCE NUMERALS UTILIZED IN THE FIGURES OF THE DRAWING

Figure 1:
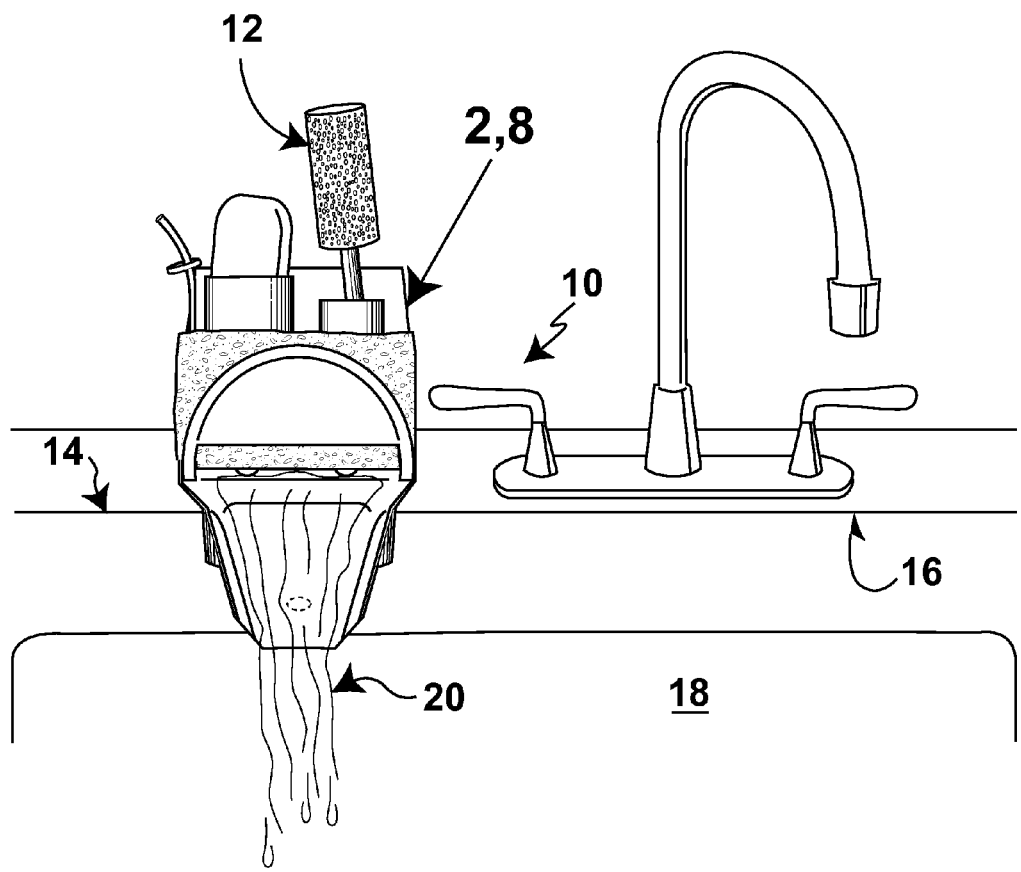
FIG. 1 is a diagrammatic perspective view of the holder of the embodiments of the present invention suspending utensils alongside a sink having a rim and a bowl, resting freely on the rim of the sink, and draining liquid from the utensils guidingly into the bowl of the sink.

A. Introductory.
10 holder of embodiments of present invention for suspending utensils 12 alongside sink 14 having rim 16 and bowl 18, for resting freely on rim 16 of sink 14, and for draining liquid 20 from utensils 12 guidingly into bowl 18 of sink 14
12 utensils
14 sink
16 rim of sink 14
18 bowl of sink 14
20 liquid
B. Overall Configuration of First Embodiment of Holder 10.
22 base for resting freely above, and across, rim 16 of sink 14
24 wall for suspending utensils 12

26 chute for draining liquid 20 from utensils 12 guidingly into bowl 18 of sink 14
28 one end of base 22
30 opposite end of base 22
  (1) Specific Configuration of Base 22.
32 pair of axial sides 32 of base 22
34 pair of barrier fences of base 22 for guiding liquid 20 draining from utensils 12 onto chute 26
36 uppermost surface of base 22
38 pair of rails 38 of base 22 for holding bar of soap and/or sponge 39 above upper surface 36 of base 22 so as to allow bar of soap and/or sponge 39 to drain
39 sponge
40 lowermost surface of base 22
42 pair of support legs of base 22 for resting freely outside of rim 16 of sink 14 so as to allow base 22 to rest freely above, and across, rim 16 of sink 14
44 arch of base 22 for resting sponge 39 thereupon
  (2) Specific Configuration of Wall 24.
46 pair of axial sides of wall 24
48 free end of wall 24
50 pair of barrier fences of wall 24
52 innermost surface of wall 24
54 pair of receptacles of wall 24 for holding utensils 12
56 post of wall 24 for holding jewelry ring 60 and like
58 outwardly curving portion of post 56 of wall 24
60 jewelry ring and like
  (3) Specific Configuration of Chute 26.
61 pair of axial sides of chute 26
62 free working end of chute 26 for overlying bowl 18 of sink 14 so as to allow chute 26 to guide liquid 20 to drain into bowl 18 of sink 14
64 pair of barrier fences of chute 26
66 lowermost surface of chute 26
68 support leg of chute 26 for resting on rim 16 of sink 14
C. Overall Configuration of Second Embodiment of Holder 110.
110 holder
126 chute

5. DETAILED DESCRIPTION OF THE PREFERRED EMBODIMENTS

A. Introductory.

Referring now to the figures, in which like numerals indicate like parts, and particularly to FIG. 1, which is a diagrammatic perspective view of the holder of the embodiments of the present invention suspending utensils alongside a sink having a rim and a bowl, resting freely on the rim of the sink, and draining liquid from the utensils guidingly into the bowl of the sink, the holder of the embodiments of the present invention is shown generally at 10 for suspending utensils 12 alongside a sink 14 having a rim 16 and a bowl 18, for resting freely on the rim 16 of the sink 14, and for draining liquid 20 from the utensils 12 guidingly into the bowl 18 of the sink 14.

B. Overall Configuration of a First Embodiment of the Holder 10.

Figure 2:
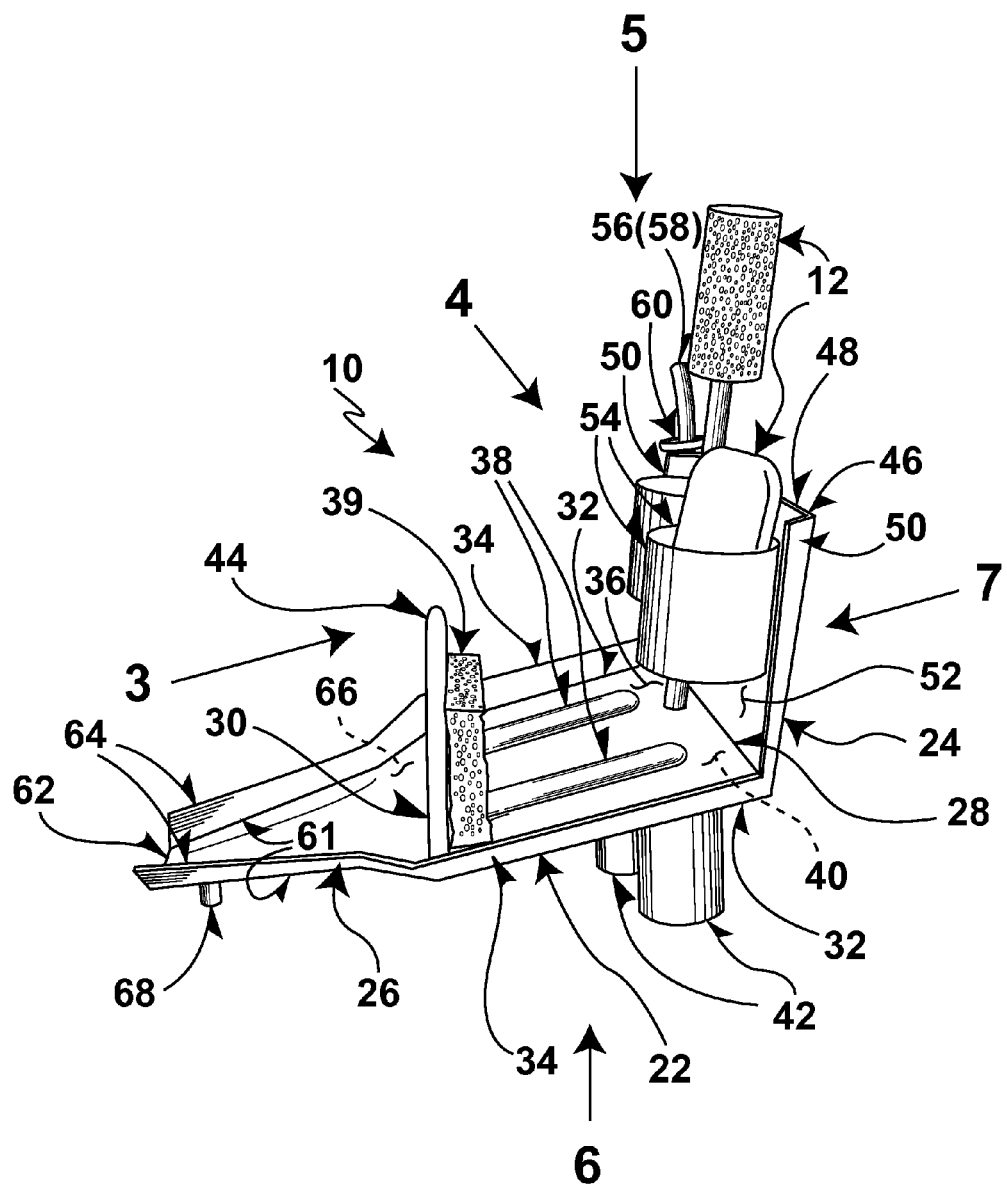
FIG. 2 is a diagrammatic perspective view of a first embodiment of the holder of the embodiments of the present invention identified by ARROW 2 in FIG. 1.
Figure 3:
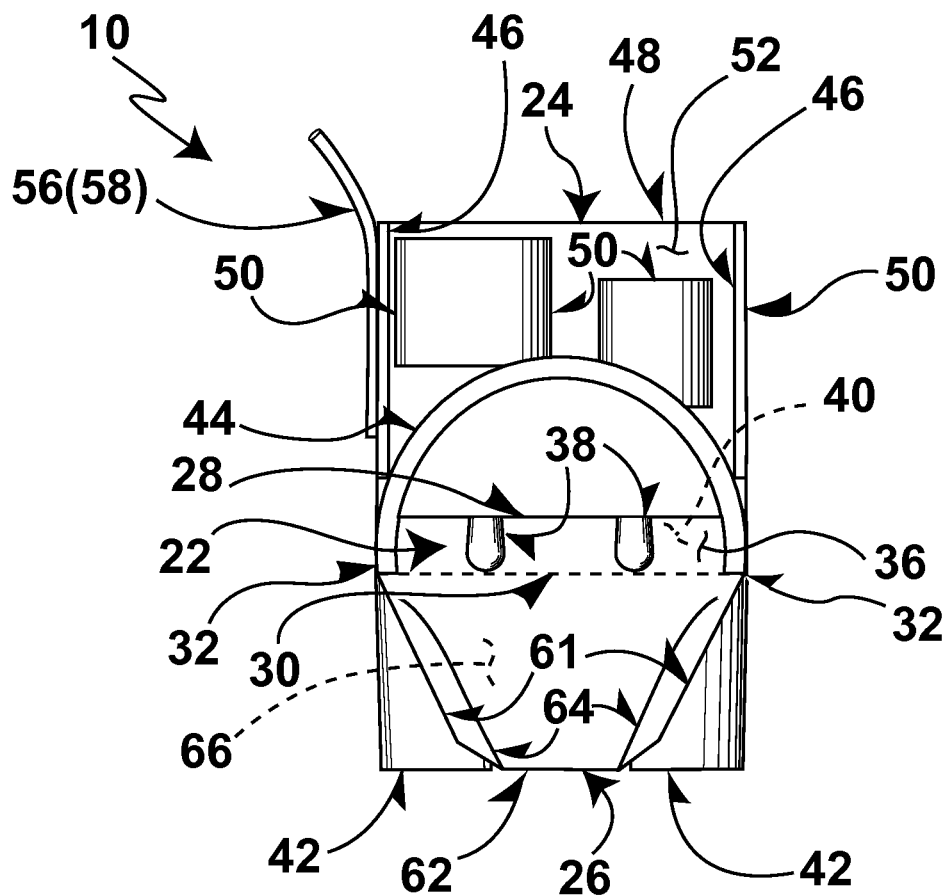
FIG. 3 is a diagrammatic front end view taken generally in the direction of ARROW 3 in FIG. 2.
Figure 4:
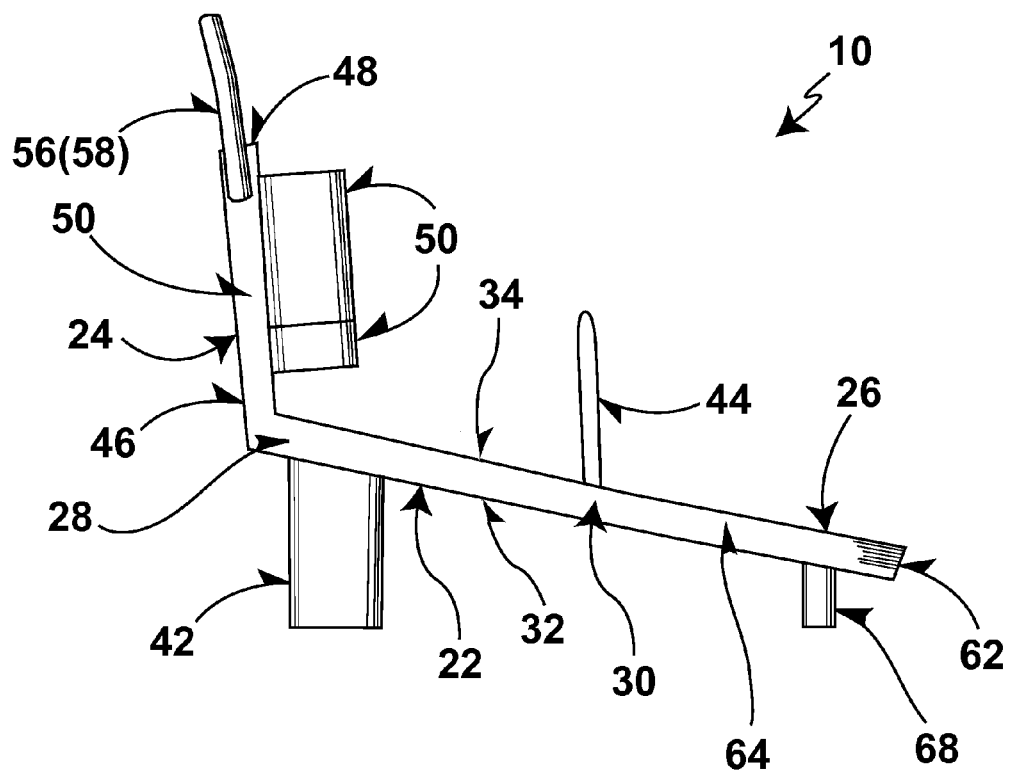
FIG. 4 is a diagrammatic side elevational view taken generally in the direction of ARROW 4 in FIG. 2.
Figure 5:
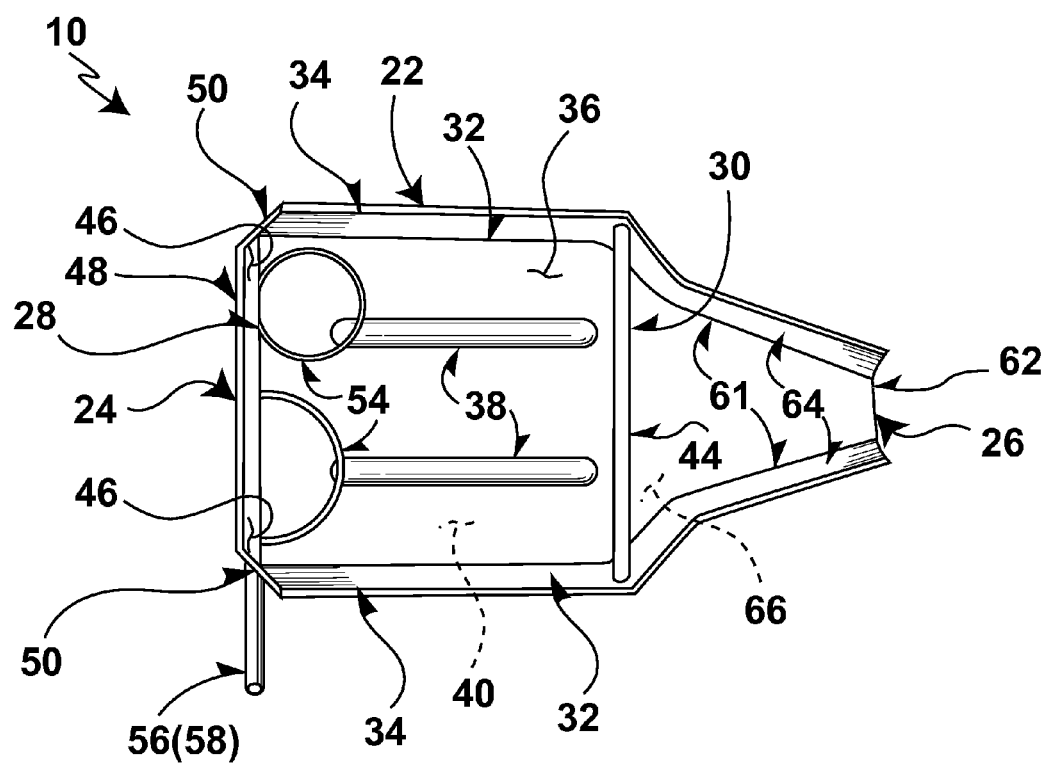
FIG. 5 is a diagrammatic top plan view taken generally in the direction of ARROW 5 in FIG. 2.
Figure 6:
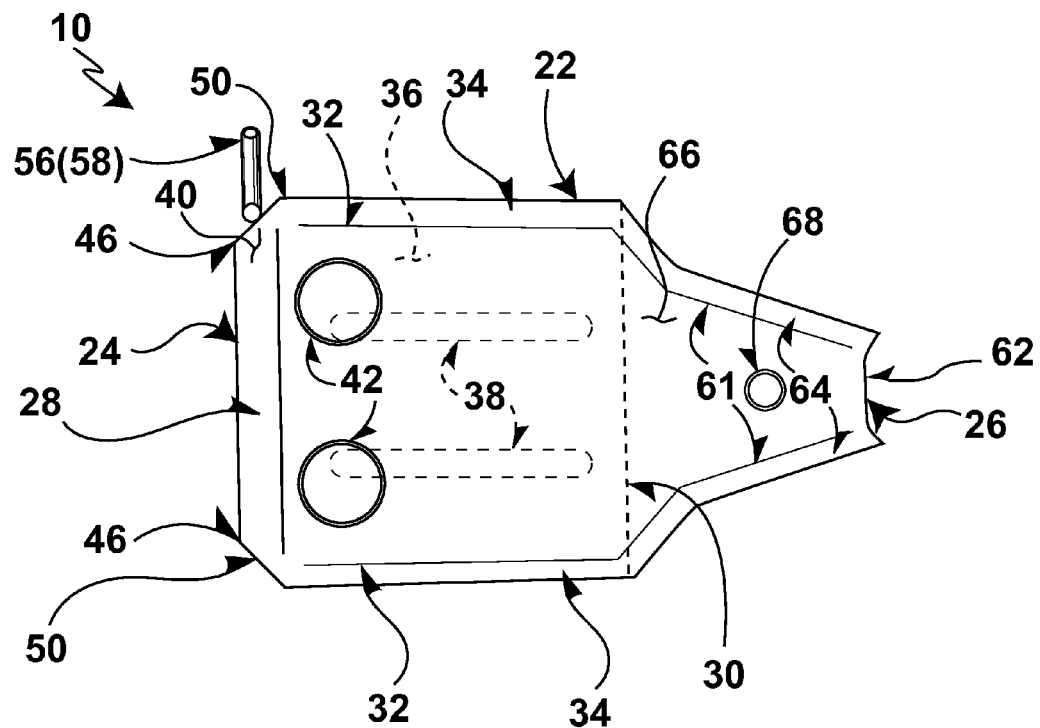
FIG. 6 is a diagrammatic bottom plan view taken generally in the direction of ARROW 6 in FIG. 2.
Figure 7:
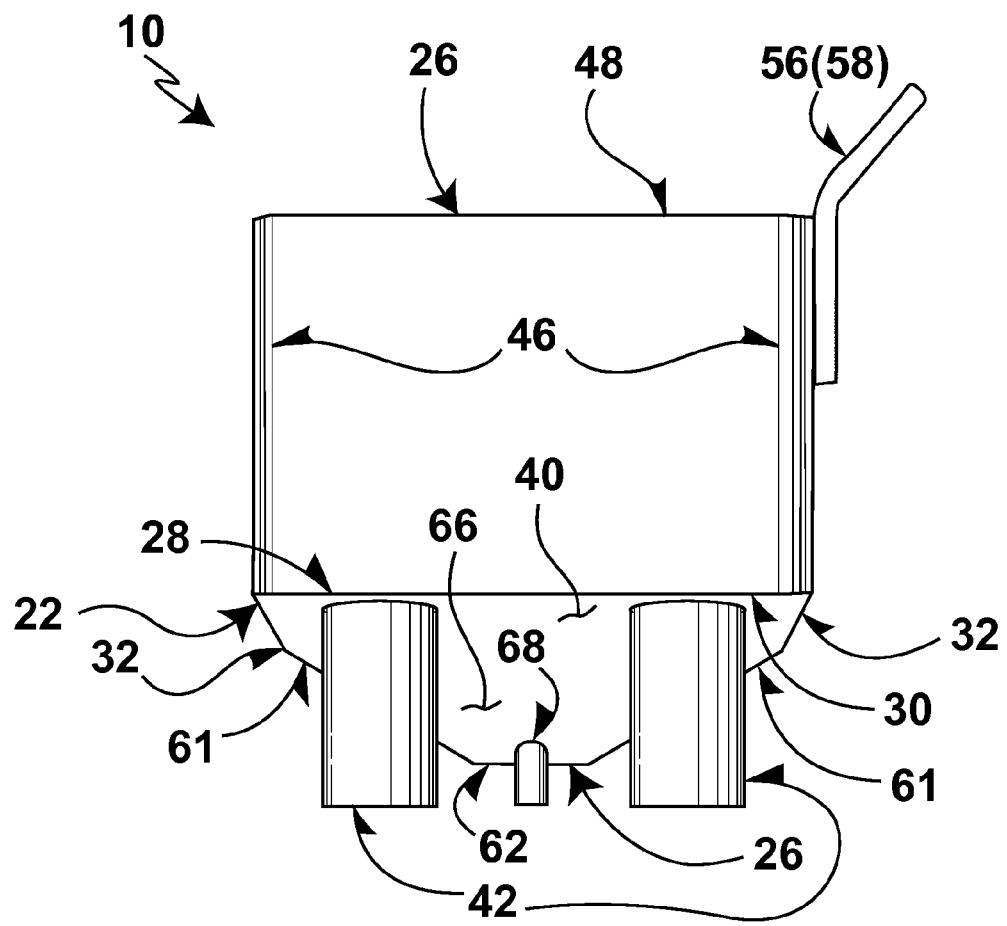
FIG. 7 is a diagrammatic rear end view taken generally in the direction of ARROW 7 in FIG. 2.

The configuration of the holder 10 can best be seen in FIGS. 2-7, which are, respectively, a diagrammatic perspective view of a first embodiment of the holder of the embodiments of the present invention identified by ARROW 2 in FIG. 1, a diagrammatic front end view taken generally in the direction of ARROW 3 in FIG. 2, a diagrammatic side elevational view taken generally in the direction of ARROW 4 in FIG. 2, a diagrammatic top plan view taken generally in the direction of ARROW 5 in FIG. 2, a diagrammatic bottom plan view taken generally in the direction of ARROW 6 in FIG. 2, and a diagrammatic rear end view taken generally in the direction of ARROW 7 in FIG. 2, and as such, will be discussed with reference thereto.

The holder 10 comprises a base 22, a wall 24, and a chute 26.

The base 22 is for resting freely above, and across, the rim 16 of the sink 14.

The wall 24 extends upwardly from one end 28 of the base 22, and is for suspending the utensils 12.

The chute 26 extends generally coplanarly from an opposite end 30 of the base 22, and is for draining the liquid 20 from the utensils 12 guidingly into the bowl 18 of the sink 14.

(1) Specific Configuration of the Base 22.

The base 22 is generally rectangular-shaped, and generally planar.

The base 22 has a pair of axial sides 32. The pair of axial sides 32 of the base 22, together with the one end 28 of the base 22 and the opposite end 30 of the base 22, define the base 22.

The base 22 further has a pair of barrier fences 34. The pair of barrier fences 34 of the base 22 extend along, and upwardly from, the pair of axial sides 32 of the base 22, respectively, and are for guiding the liquid 20 draining from the utensils 12 onto the chute 26, while adding rigidity to the base 22.

The base 22 further has an uppermost surface 36, and a pair of rails 38. The pair of rails 38 of the base 22 are spaced-apart from each other, extend axially along the uppermost surface 36 of the base 22, and are for holding a bar of soap and/or a sponge 39 above the upper surface 36 of the base 22 so as to allow the bar of soap and/or the sponge 39 to drain, while adding further rigidity to the base 22.

The base 22 further has a lowermost surface 40, and a pair of support legs 42. The pair of support legs 42 of the base 22 are spaced-apart from each other, depend from the lowermost surface 40 of the base 22, are in proximity to the one end 28 of the base 22, and are for resting freely outside of the rim 16 of the sink 14 so as to allow the base 22 to rest freely above, and across, the rim 16 of the sink 14 and have a pitch from the one end 28 of the base 22 to the opposite end 30 of the base 22 for facilitating draining.

The pair of support legs 42 of the base 22 are, preferably, tubular, but are not limited to that, and are of a height to maintain the base 22 pitched from the one end 28 of the base 22 to the opposite end 30 of the base 22.

The base 22 further has an arch 44. The arch 44 of the base 22 extends upwardly from the opposite end 30 of the base 22, and forms a stop for resting the sponge 39 thereupon, while also forming a handle to carry the holder 10.

(2) Specific Configuration of the Wall 24.

The wall 24 is generally rectangular-shaped, and generally planar.

The wall 24 has a pair of axial sides 46, and a free end 48. The pair of axial sides 46 of the wall 24, together with the free end 48 of the wall 24 and the one end 28 of the base 22, define the wall 24.

The wall 24 further has a pair of barrier fences 50. The pair of barrier fences 50 of the wall 24 extend along, and inwardly from, the pair of axial sides 46 of the wall 24, respectively, add rigidity to the wall 24, and join to the pair of barrier fences 34 of the base 22, respectively.

The wall 24 further has an innermost surface 52, and a pair of receptacles 54. The pair of receptacles 54 of the wall 24 are spaced-apart from each other, extend vertically along the innermost surface 52 of the wall 24, are above the base 22, and are for holding the utensils 12 so as to allow the utensils 12 to drain onto the base 22 (FIG. 2).

The pair of receptacles 54 of the wall 24 are, preferably, tubular, of different radii, and of different heights, but are not limited to that.

The wall 24 further has a post 56. The post 56 of the wall 24 extends upwardly from one barrier fence 50 of the wall 24, past the free end 48 of the wall 24 in an outwardly curving portion 58 so as not to interfere with an adjacent receptacle 54 of the wall 24, and is for holding jewelry rings 60 and the like (FIG. 2).

(3) Specific Configuration of the Chute 26.

The chute 26 is generally trapezoidal-shaped, and generally planar.

The chute 26 has a pair of axial sides 61, and a free working end 62. The pair of axial sides 61 of the chute 26, together with the free working end 62 of the chute 26 and the opposite end 30 of the base 22, define the chute 26.

The chute 26 tapers from the opposite end 30 of the base 22 to the free working end 62 of the chute 26 so as to allow the chute 26 to guide the liquid 20 to drain into the bowl 18 of the sink 14, and is for overlying the bowl 18 of the sink 14.

The chute 26 further has a pair of barrier fences 64. The pair of barrier fences 64 of the chute 26 extend along, and upwardly from, the pair of axial sides 61 of the chute 26, respectively, add rigidity to the chute 26, and join to the pair of barrier fences 34 of the base 22, respectively.

The chute 26 further has a lowermost surface 66, and a support leg 68. The support leg 68 of the chute 26 depends from the lowermost surface 66 of the chute 26, has a height to continue the pitch of the base 22, is in proximity of the free working end 62 of the chute 26, and is for resting on the rim 16 of the sink 14.

The support leg 68 of the chute 26 is, preferably, tubular, but is not limited to that.

C. Overall Configuration of a Second Embodiment of the Holder 110.

Figure 8:
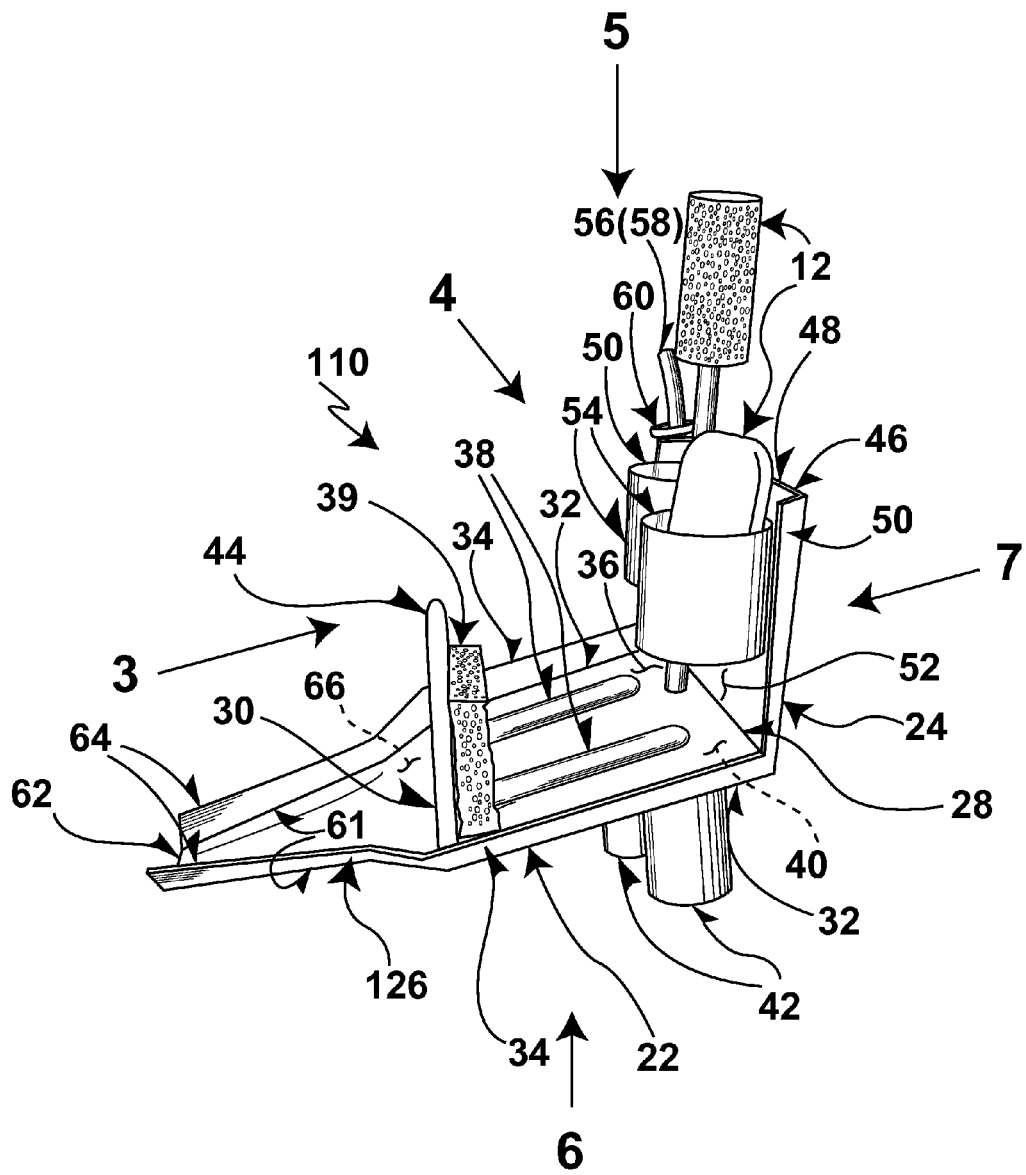
FIG. 8 is a diagrammatic perspective view of a second embodiment of the holder of the embodiments of the present invention identified by ARROW 8 in FIG. 1.

As can be seen from FIG. 8, which is a diagrammatic perspective view of a second embodiment of the holder of the embodiments of the present invention identified by ARROW 8 in FIG. 1, a second embodiment of the holder 110 of the present invention is similar to the holder 10, except that it is void of the support leg 68 of the chute 126, and thereby has the chute 126 resting directly on the rim 16 of the sink 14.

D. Impressions.

It will be understood that each of the elements described above or two or more together may also find a useful application in other types of constructions differing from the types described above.

While the embodiments of the present invention have been illustrated and described as embodied in a holder for suspending utensils alongside a sink having a rim and a bowl, for resting freely on the rim of the sink, and for draining liquid from the utensils guidingly into the bowl of the sink, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A holder for suspending utensils alongside a sink having a rim and a bowl, for resting freely on the rim of the sink, and for draining liquid from the utensils guidingly into the bowl of the sink, comprising:
   a) a base;
   b) a wall; and
   c) a chute;
   wherein said base is for resting freely above the rim of the sink;
   wherein said base is for resting freely across the rim of the sink;
   wherein said wall extends upwardly from one end of said base, said wall having a pair of barrier fences;
   wherein said wall is for suspending the utensils;
   wherein said chute extends generally coplanarly from an opposite end of said base;
   wherein said chute is for draining the liquid from the utensils guidingly into the bowl of the sink
   wherein said base has a pair of axial sides;
   wherein said pair of axial sides of said base, together with said one end of said base and said opposite end of said base, define said base;
   wherein said base has an arch;
   wherein said arch of said base extends upwardly from said opposite end of said base; and
   wherein said arch of said base forms a stop for resting a sponge thereupon; and,
   wherein said arch extends substantially from one axial side of the base to the other axial side of the base.

2. The holder of claim 1, wherein said base is generally rectangular-shaped; and
   wherein said base is generally planar.

3. The holder of claim 1, wherein said base has a pair of barrier fences.

4. The holder of claim 3, wherein said pair of barrier fences of said base extend along said pair of axial sides of said base, respectively;
   wherein said pair of barrier fences of said base extend upwardly from said pair of axial sides of said base, respectively;
   wherein said pair of barrier fences of said base are for guiding the liquid draining from the utensils onto said chute; and
   wherein said pair of barrier fences of said base add rigidity to said base.

5. The holder of claim 3, wherein said base has a pair of support legs.

6. The holder of claim 5, wherein said base has a lowermost surface;
   wherein said pair of support legs of said base are spaced-apart from each other;
   wherein said pair of support legs of said base depend from said lowermost surface of said base;
   wherein said pair of support legs of said base are disposed in proximity to said one end of said base; and
   wherein said pair of support legs of said base are for resting freely outside of the rim of the sink so as to allow said base to rest freely above, and across, the rim of the sink, and have a pitch from said one end of said base to said opposite end of said base.

7. The holder of claim 6, wherein said pair of support legs of said base are tubular; and wherein said pair of support legs of said base are of a height to maintain said pitch of said base from said one end of said base to said opposite end of said base.

8. The holder of claim 7, wherein said chute has a pair of axial sides;
   wherein said chute has a free working end;
   wherein said pair of axial sides of said chute, together with said free working end of said chute and said opposite end of said base, define said chute;
   wherein said chute tapers from said opposite end of said base to said free working end of said chute so as to allow said chute to guide the liquid to drain into the bowl of the sink; and
   wherein said chute is for overlying the bowl of the sink.

9. The holder of claim 8, wherein said chute has a pair of barrier fences.

10. The holder of claim 9, wherein said pair of barrier fences of said chute extend along said pair of axial sides of said chute, respectively;
    wherein said pair of barrier fences of said chute extend upwardly from said pair of axial sides of said chute, respectively;
    wherein said pair of barrier fences of said chute add rigidity to said chute; and
    wherein said pair of barrier fences of said chute join to said pair of barrier fences of said base, respectively.

11. The holder of claim 8, wherein said chute has a support leg.

12. The holder of claim 11, wherein said chute has a lowermost surface;
    wherein said support leg of said chute depends from said lowermost surface of said chute;
    wherein said support leg of said chute has a height so as to allow said chute to continue said pitch of said base;
    wherein said support leg of said chute is in proximity of said free working end of said chute; and
    wherein said support leg of said chute is for resting on the rim of the sink.

13. The holder of claim 11, wherein said support leg of said chute is tubular.

14. The holder of claim 3, wherein said wall has a pair of axial sides;
    wherein said wall has a free end; and
    wherein said pair of axial sides of said wall, together with said free end of said wall and said one end of said base, define said wall.

15. The holder of claim 14, wherein said pair of barrier fences of said wall extend along said pair of axial sides of said wall, respectively;
    wherein said pair of barrier fences of said wall extend inwardly from said pair of axial sides of said wall, respectively;
    wherein said pair of barrier fences of said wall add rigidity to said wall; and
    wherein said pair of barrier fences of said wall join to said pair of barrier fences of said base, respectively.

16. The holder of claim 1, wherein said base has a pair of rails.

17. The holder of claim 16, wherein said base has an uppermost surface;
    wherein said pair of rails of said base are spaced-apart from each other;
    wherein said pair of rails of said base extend axially along said uppermost surface of said base;
    wherein said pair of rails of said base are for holding a bar of soap and/or a sponge above said upper surface of said base so as to allow the bar of soap and/or the sponge to drain; and
    wherein said pair of rails of said base add rigidity to said base.

18. The holder of claim 1, wherein said wall is generally rectangular-shaped; and wherein said wall is generally planar.

19. The holder of claim 1, wherein said wall has a pair of receptacles.

20. The holder of claim 19, wherein said wall has an innermost surface;

wherein said pair of receptacles of said wall are spaced-apart from each other;

wherein said pair of receptacles of said wall extend vertically along said innermost surface of said wall;

wherein said pair of receptacles of said wall are above said base; and wherein said pair of receptacles of said wall are for holding the utensils so as to allow the utensils to drain onto said base.

21. The holder of claim 19, wherein said pair of receptacles of said wall are tubular and have top and bottom open ends;

wherein said pair of receptacles of said wall are of different radii; and wherein said pair of receptacles of said wall are of different heights above the base.

22. The holder of claim 19, wherein said wall has a post.

23. The holder of claim 22, wherein said post of said wall extends upwardly from one barrier fence of said wall;

wherein said post of said wall extends past said free end of said wall in an outwardly curving portion so as not to interfere with an adjacent receptacle of said wall; and wherein said outwardly curving portion of said post of said wall is for holding a jewelry ring.

24. The holder of claim 1, wherein said chute is generally trapezoidal-shaped; and wherein said chute is generally planar.

\* \* \* \* \*